(12) United States Patent
Reese

(10) Patent No.: US 9,205,983 B1
(45) Date of Patent: Dec. 8, 2015

(54) LIFTING AND TRANSPORTING DEVICE

(71) Applicant: Timothy J Reese, Mays Landing, NJ (US)

(72) Inventor: Timothy J Reese, Mays Landing, NJ (US)

( * ) Notice: Subject to any disclaimer, the term of this patent is extended or adjusted under 35 U.S.C. 154(b) by 0 days.

(21) Appl. No.: 14/484,345

(22) Filed: Sep. 12, 2014

(51) Int. Cl.
   *B65G 7/12* (2006.01)

(52) U.S. Cl.
   CPC .......................... *B65G 7/12* (2013.01)

(58) Field of Classification Search
   USPC .......... 294/15, 16, 137, 140, 17, 24, 26, 27.1, 294/32, 34, 159, 160, 161, 170; 16/422, 16/435, 443; D8/14
   See application file for complete search history.

(56) References Cited

U.S. PATENT DOCUMENTS

| | | | | |
|---|---|---|---|---|
| 2,428,941 A * | 10/1947 | Packard | ................... | B65G 7/12 294/15 |
| 2,620,955 A * | 12/1952 | Elder | ..................... | B63B 17/00 294/15 |
| 2,776,856 A * | 1/1957 | Ingram | ..................... | A45F 5/10 294/101 |
| D217,002 S * | 3/1970 | Wagner | ........................... | 294/15 |
| 4,098,442 A * | 7/1978 | Moore | ................. | B65G 49/061 294/141 |
| 4,113,160 A * | 9/1978 | Spiers | ...................... | B65G 7/12 294/15 |
| 4,135,655 A * | 1/1979 | Brown | ..................... | B65G 7/12 211/41.15 |
| 4,155,582 A * | 5/1979 | Reisner | .................... | A01B 1/22 294/58 |
| 4,515,242 A * | 5/1985 | LaChance | ................. | E06C 7/14 182/106 |
| D290,931 S * | 7/1987 | Powell | .......................... | D8/371 |
| 4,695,085 A * | 9/1987 | Cassels | .................... | B65G 7/12 294/15 |
| 5,161,843 A * | 11/1992 | Baldwin | .................. | B65G 7/12 294/16 |
| 5,511,285 A * | 4/1996 | Bush | ........................ | E06C 7/50 16/422 |
| 6,186,566 B1 * | 2/2001 | Frederickson | ........... | B65G 7/12 294/15 |
| 6,309,000 B1 * | 10/2001 | Pittman | ................... | B65G 7/12 294/15 |
| D538,611 S * | 3/2007 | Morris | ............................ | D8/14 |
| 2013/0113228 A1* | 5/2013 | Gieseke | .................. | B65G 7/12 294/137 |

* cited by examiner

*Primary Examiner* — Paul T Chin
(74) *Attorney, Agent, or Firm* — Stuart M. Goldstein

(57) ABSTRACT

A transporting and lifting device has a handle upstanding from a base member. The device has at least three lifting elements extending parallel to the base member for lifting a variety of objects of various weights and configurations. The device is lightweight and portable for ease of use with those objects to be lifted.

10 Claims, 3 Drawing Sheets

LIFTING AND TRANSPORTING DEVICE

FIELD OF THE INVENTION

The present invention relates to a portable device for lifting and transporting heavy and bulky objects, including ladders, especially extension ladders, large and small pails, coolers and building construction panels.

BACKGROUND OF THE INVENTION

Lifting and carrying heavy objects is often difficult and awkward. It can even sometimes be the cause of neck, shoulder and back injuries. This is especially true in the construction industry, where it is necessary to lift and transport bulky items such as extension ladders and large tools and heavy objects like five gallon pails and giant size coolers filled with ice. While many lifting handles, tools, holders, carriers and hauling devices have been proposed to assist in lifting and carrying heavy and cumbersome objections, none accomplish this objective and also provide the versatility to be used to readily and easily lift and carry a variety of different objects.

SUMMARY OF THE INVENTION

It is thus the object of the present invention to overcome the limitations and disadvantages of existing heavy object lifting devices.

It is the object of the present invention to provide a lifting and transporting device which is configured to assist in readily and easily lifting and then carrying bulky items like extension ladders and heavy items such as filled five gallon pails.

It is the further object of the present invention to provide a lifting and transporting device which readily and easily assists in lifting and carrying a variety of different objects of various weights and configurations.

It is still another object of the present invention to provide a lifting and transporting device which is lightweight and portable.

These and other objects are accomplished by the present invention, a transporting and lifting device which has a handle upstanding from a base member. The device has at least three lifting elements extending parallel to the base member for lifting a variety of objects of various weights and configurations. The device is lightweight and portable for ease of use with those objects to be lifted.

Novel features which are considered as characteristic of the invention are set forth in particular in the appended claims. The invention, itself, however, both as to its design, construction and use together with additional features and advantages thereof, are best understood upon review of the following detailed description with reference to the accompanying drawings.

DETAILED DESCRIPTION OF THE INVENTION

Figure 1:
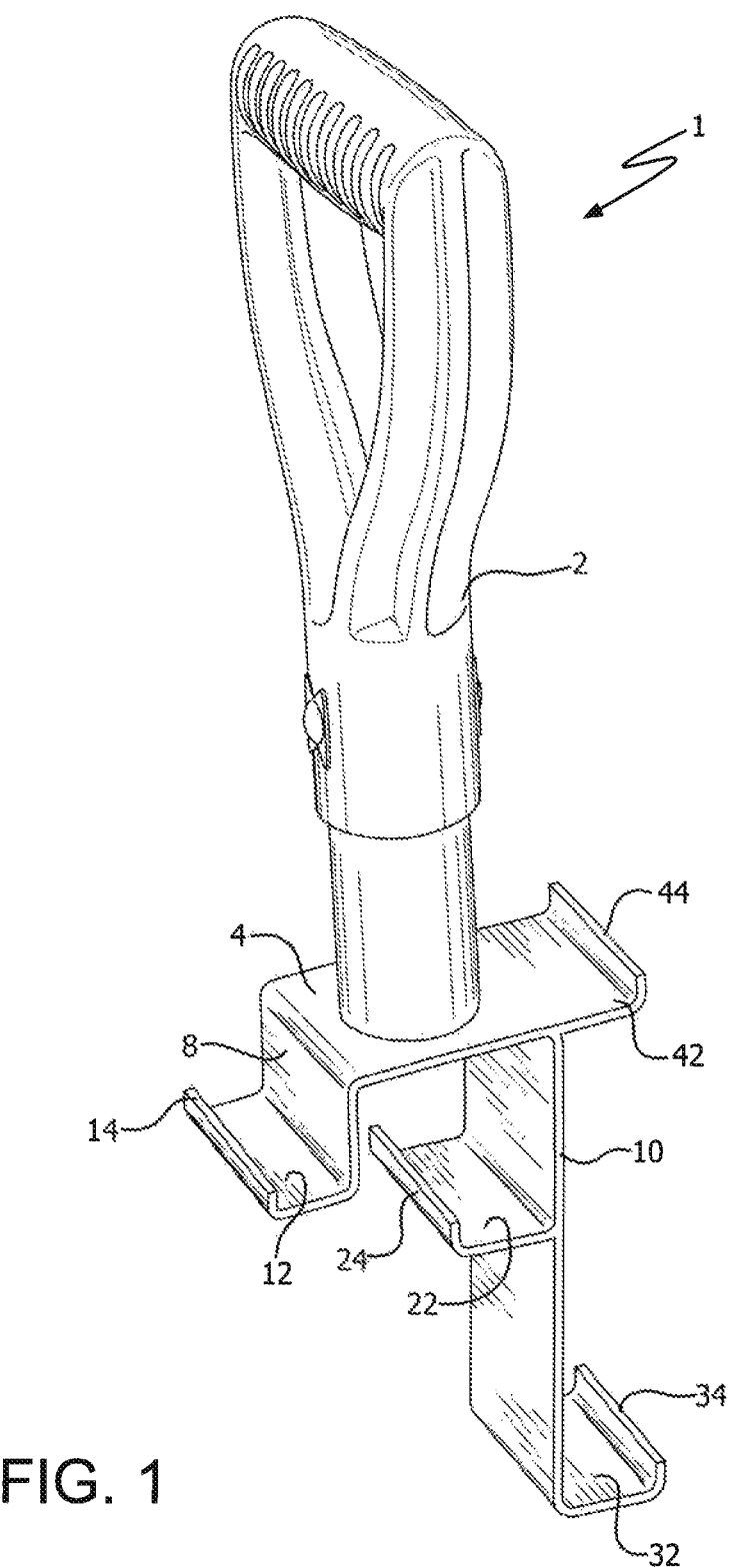
FIG. 1 is a perspective view the lifting and transporting device of the present invention.
Figure 2:
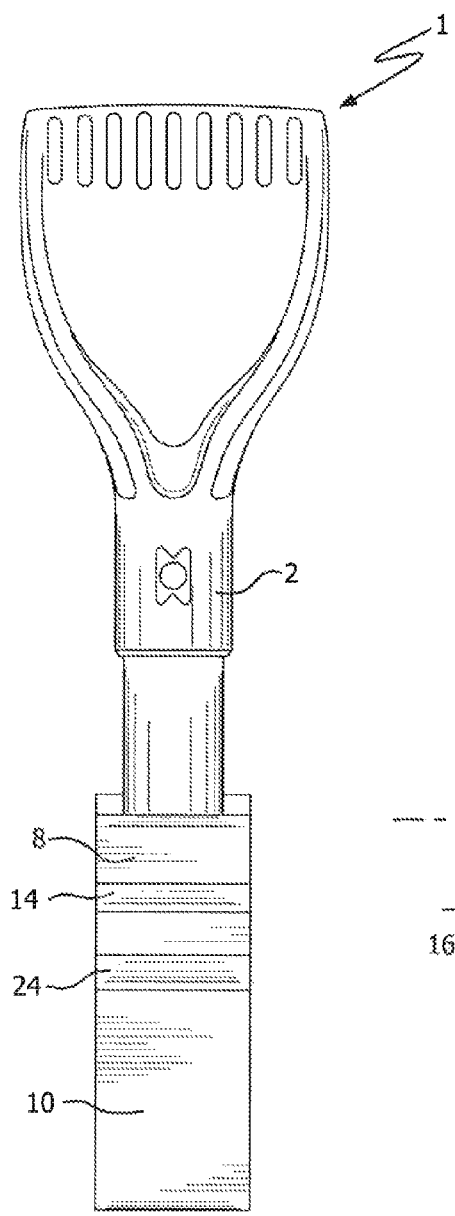
FIG. 2 is a front view of the lifting and transporting device of the present invention.
Figure 3:
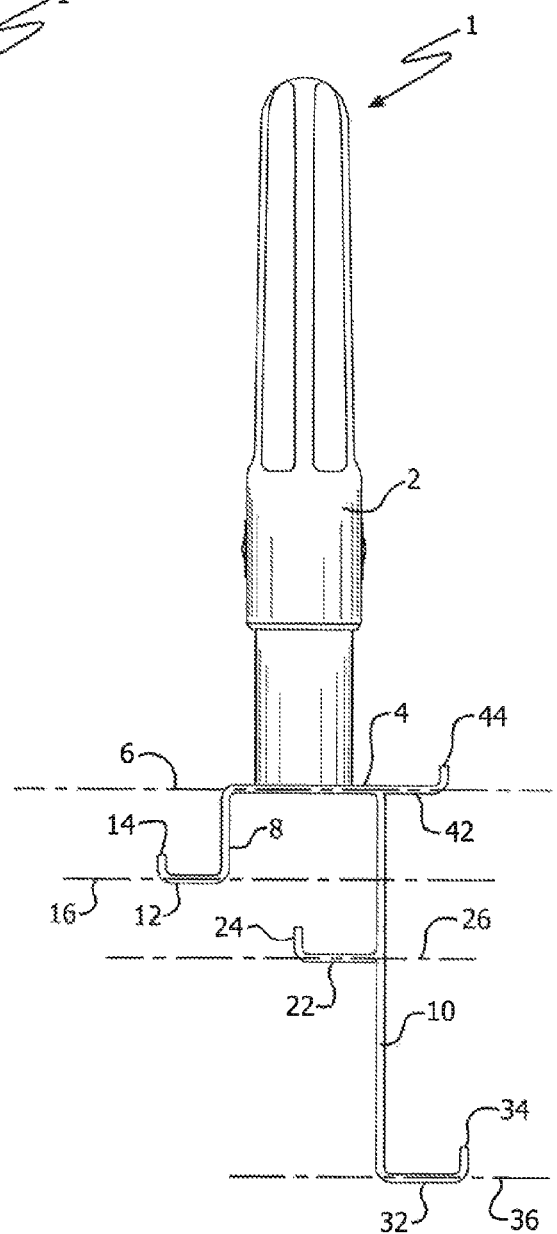
FIG. 3 is an elevation view of the lifting and transporting device of the present invention.

Lifting and transporting device 1 comprises handle member 2 upstanding from base member 4 having longitudinal axis 6. Support 8 extends down from one end of base member 4 and support 10 extends down near the opposite end of the base member. First lifting element 12 with longitudinal axis 16 extends outwardly from support 8 and hence outwardly in relation to base member 4. Lifting element 12 extends perpendicularly from support 8 and its longitudinal axis 16 is parallel to longitudinal axis 6 of base member 4. Lip 14 extends up from lifting element 12.

Second lifting element 22 with longitudinal axis 26 extends inwardly from support 10 and hence under base member 4. Lifting element 22 extends perpendicularly from support 10 and its longitudinal axis 26 is parallel to longitudinal axis 6 of base member 4 and longitudinal axis 16 of lifting element 12. Lip 24 extends up from lifting element 22.

Third lifting element 32 with longitudinal axis 36 extends outwardly from support 10 and hence outwardly in relation to base member 4. Lifting element 32 extends perpendicularly from support 10 and its longitudinal axis 36 is parallel to longitudinal axis 6 of base member 4, longitudinal axis 16 of lifting element 12, and longitudinal axis 26 of lifting element 22. Lip 34 extends up from lifting element 32.

Fourth lifting element 42 is an extension of and extends outwardly from base member 4. Longitudinal axis 6 of base member 4 is also the longitudinal axis of lifting element 42. Lip 44 extends from the lifting element 42.

While the herein disclosure describes fourth lifting element 42, it is contemplated that the lifting and transporting device 1 of the present invention can be designed and utilized without this lifting element.

Figure 4:
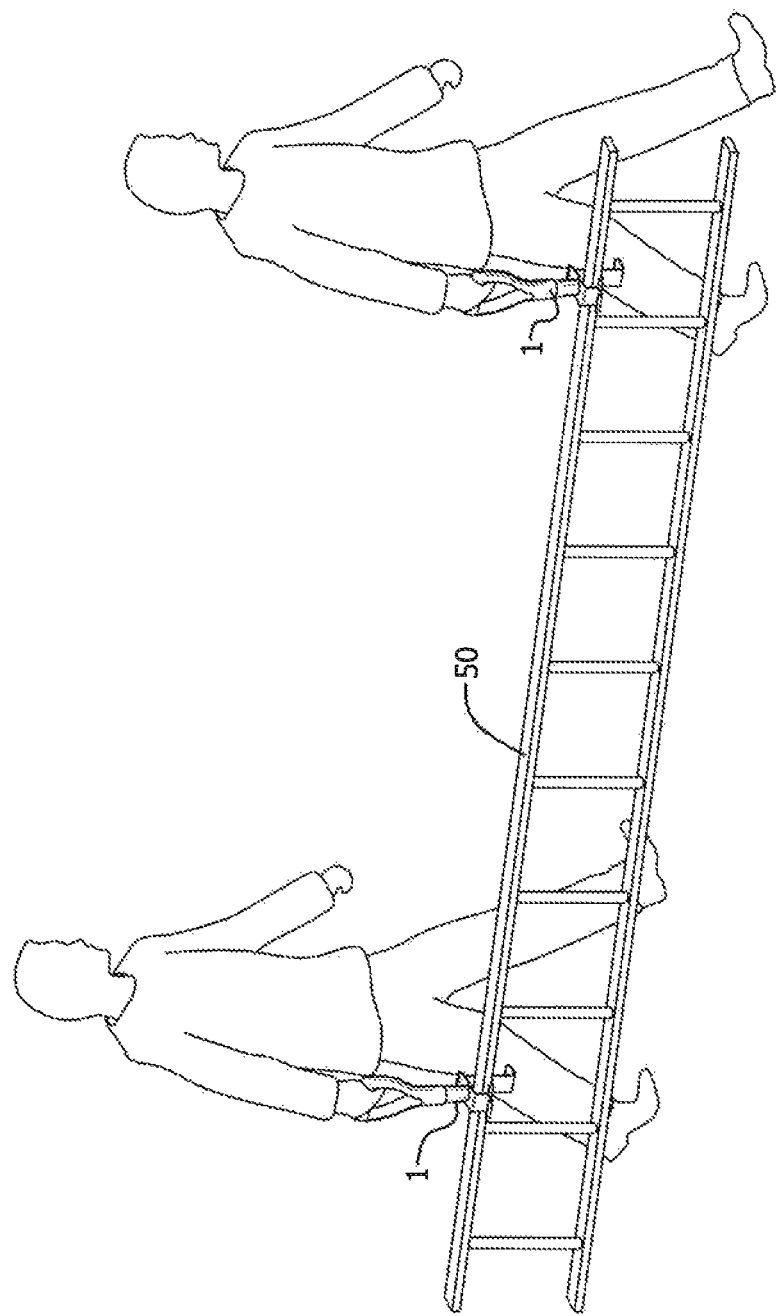
FIG. 4 shows the use of the lifting and transporting device of the present invention to lift and carry a ladder.

Given its unique configuration, lifting and transporting device 1 is very versatile, in that it can be utilized to lift and then transport a wide variety of objects, especially long ladders 50 (see FIG. 4). By way of further examples only, and not to be considered restrictive of the many uses of device 1, lifting elements 12 and 22 can not only be used to conveniently lift and transport lengthy ladders, but they can also lift five gallon pails and large coolers. Lifting elements 12 and 32 can lift sheets of plywood or sheet rock, and all the lifting elements can carry such objects as smaller pails, beach chairs, bags of groceries and the like.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. The lifting and transporting device comprising:
   a handle member upstanding from a base member;
   a first lifting element supported by and extending outwardly of the base member;
   a second lifting element supported by and extending under the base member; and
   a third lifting element supported by and extending outwardly of the base member, and wherein the base member, the first lifting element, the second lifting element, and the third lifting element each have a longitudinal axis and the longitudinal axis of each of the lifting elements is parallel to the longitudinal axis of the base member;

whereby the device is configured to lift and transport objects on any one of the lifting elements independently of the other lifting elements.

2. The devices as is claim 1 further comprising a fourth lifting element configured to lift and transport objects independently of the other lifting elements.

3. The devices as in claim 2 wherein the fourth lifting element is an outward extension of the base member.

4. The lifting and transporting device comprising:
a handle member upstanding from a base member;
a first support extending down from the base member;
a second support extending do from the base member;
a first lifting element extending from the first support;
a second lifting element and a third lifting element, each of these lifting elements extending from the second support; and
a fourth lifting element configured to lift and transport objects independently of the other lifting elements, wherein said fourth lifting element is an outward extension of the base member, whereby the device is configured to lift and transport objects on any one of the lifting elements independently of the other lifting elements.

5. The device as in claim 4 wherein the base member, the first lifting element, the second lifting element, and the third lifting element each have a longitudinal axis and wherein the longitudinal axis of each of the lifting elements is parallel to the longitudinal axis of the base member.

6. The device as in claim 4 wherein the first lifting element, the second lifting element, and the third lifting element extend perpendicularly from the first and second supports.

7. The device as in claim 6 wherein the base member, the first lifting element, the second lifting element, and the third lifting element each have a longitudinal axis and wherein the longitudinal axis of each of the lifting elements is parallel to the longitudinal axis of the base member.

8. The device as in claim 4 wherein the base member, the first lifting element, the second lifting element, and the third lifting element each have a longitudinal axis and wherein the longitudinal axis of each on the lifting elements is parallel to the longitudinal axis of the base member.

9. The device as in claim 8 wherein the first lifting element, the second lifting element, and the third lifting element extend perpendicularly from the first and second supports.

10. The device as in claim 9 wherein the first and third lifting elements extend outwardly from the base member and the second lifting element extends under the base member.

\* \* \* \* \*